US012722417B1

(12) United States Patent
Gulis et al.

(10) Patent No.: US 12,722,417 B1
(45) Date of Patent: Sep. 1, 2026

(54) MULTIFUNCTIONAL ORGANIZER

(71) Applicants: Ben Ian Gulis, State College, PA (US); Maggie Eve Gulis, State College, PA (US)

(72) Inventors: Ben Ian Gulis, State College, PA (US); Maggie Eve Gulis, State College, PA (US)

( * ) Notice: Subject to any disclaimer, the term of this patent is extended or adjusted under 35 U.S.C. 154(b) by 0 days.

(21) Appl. No.: 19/218,232

(22) Filed: May 24, 2025

(51) Int. Cl.
*B43M 99/00* (2010.01)

(52) U.S. Cl.
CPC .................................. *B43M 99/00* (2013.01)

(58) Field of Classification Search
CPC ........ A45D 33/18; A45D 33/22; A45C 11/34; A47J 47/16; A47J 47/20; B65D 81/365; B43M 99/006; B43M 99/009; B43M 99/01; B43M 99/008; B43M 99/00
See application file for complete search history.

(56) References Cited

U.S. PATENT DOCUMENTS 1,643,477 A * 9/1927 Warren .................. B43M 99/00 211/69.4
1,756,048 A * 4/1930 Williams ................. A45C 3/06 383/7
2,720,884 A * 10/1955 Fritz .................... A45D 40/221 132/297
2,747,586 A * 5/1956 Vogelman .............. A45D 33/18 132/297
3,972,419 A * 8/1976 Short ..................... A47G 23/08 211/131.1
4,073,397 A * 2/1978 Snodgrass ............ B65D 81/365 446/76
4,176,743 A * 12/1979 Fitzpatrick ........... B43M 99/001 206/564
4,475,022 A * 10/1984 Polhemus .............. B43M 99/00 220/23.8
4,753,346 A * 6/1988 Tsuji ...................... A45C 11/36 446/75
4,934,527 A * 6/1990 Ho ............................ A47F 7/03 206/214
4,991,712 A * 2/1991 Wagner ................ B43M 99/008 206/214
5,009,336 A * 4/1991 Liaw .................... B43M 99/008 206/214

(Continued)

FOREIGN PATENT DOCUMENTS

CN 108116143 A * 6/2018 .......... B43M 99/009
DE 29912489 U1 * 9/1999 ............ B43M 99/00
WO WO-2013048562 A1 * 4/2013 ................ B42F 7/08

*Primary Examiner* — Patrick D Hawn
(74) *Attorney, Agent, or Firm* — John J. Elnitski, Jr.

(57) ABSTRACT

An organizer having a base with an inside upper surface and an outside lower surface that curves up to an edge to form a wall about the base. The outside lower surface including a flat bottom to support the organizer. A main body extending up from the base having a front, a rear and two sides, and having body cavity. A flat open storage area between the wall of the base and the main body. A neck extending from the main body near the front of the main body. A head extending from the neck having a front and a rear. The rear of the head including a head cavity. A plurality of finger extensions extending from the rear of the main body with spaces between the finger extensions. A side cavity on an outside of the main body on each of the sides of the main body.

17 Claims, 18 Drawing Sheets

(56) References Cited

U.S. PATENT DOCUMENTS

| | | | | | |
|---|---|---|---|---|---|
| 5,219,446 | A * | 6/1993 | Klepac | B25H 3/02 | 362/154 |
| 5,246,020 | A * | 9/1993 | Wu | A45D 33/24 | 206/823 |
| 5,433,643 | A * | 7/1995 | Pratt | A63H 3/005 | 446/268 |
| 5,441,149 | A * | 8/1995 | Willard | A45C 11/34 | 206/214 |
| 5,487,466 | A * | 1/1996 | Robson | B43M 99/009 | 206/214 |
| 5,740,906 | A * | 4/1998 | Lai | B43M 99/008 | 206/214 |
| 5,755,321 | A * | 5/1998 | Wang | B43M 99/008 | 206/214 |
| 5,850,940 | A * | 12/1998 | Sloan | A61C 15/043 | 222/541.6 |
| 6,026,960 | A * | 2/2000 | Cogliano | A63H 3/005 | 206/457 |
| 6,519,883 | B2 * | 2/2003 | Martorella | A47G 1/142 | 40/725 |
| 7,310,841 | B2 * | 12/2007 | Chen | B43M 99/00 | 206/214 |
| 7,441,366 | B2 * | 10/2008 | Van Houten, II | A01M 31/06 | 206/315.11 |
| 7,717,277 | B2 * | 5/2010 | Meinhardt | B25H 3/06 | 312/330.1 |
| 7,878,337 | B2 * | 2/2011 | Abdullah | A45C 11/34 | 312/285 |
| 8,220,645 | B2 * | 7/2012 | Robinson | F21V 33/0048 | 211/11 |
| 8,925,743 | B1 * | 1/2015 | Lee | A47L 19/04 | 211/41.6 |
| 9,039,226 | B2 * | 5/2015 | Abdullah | B43K 23/001 | 362/132 |
| 9,427,135 | B2 * | 8/2016 | Audet | A47J 47/20 | |
| 11,039,731 | B2 * | 6/2021 | Han | A47L 19/04 | |
| D957,774 | S * | 7/2022 | Han | D32/55 | |
| D977,775 | S * | 2/2023 | Zhang | D32/55 | |
| D982,867 | S * | 4/2023 | Xu | D32/55 | |
| 2005/0142980 | A1 * | 6/2005 | Rivero | B65D 81/365 | 446/75 |
| 2007/0151937 | A1 * | 7/2007 | Gillisie | A47L 19/04 | 211/41.6 |
| 2010/0059460 | A1 * | 3/2010 | Mulaw | A47L 19/04 | 211/41.3 |
| 2012/0037520 | A1 * | 2/2012 | Cline | A47B 41/00 | 206/214 |
| 2012/0138550 | A1 * | 6/2012 | Wisniewski | A47L 19/04 | 211/41.3 |
| 2022/0369894 | A1 * | 11/2022 | Moss | A47L 19/04 | |

* cited by examiner

SECTION A-A

SECTION B-B

MULTIFUNCTIONAL ORGANIZER

BACKGROUND

The field of invention generally relates to an apparatus for organizers. More specifically, the present invention relates to adjustable multifunctional organizers.

Storage and organization solutions are widely used for managing stationery, personal accessories, and household essentials. However, existing organizers and storage solutions suffer from several deficiencies. Most organizers have fixed storage layouts with predefined compartments which limit customizability for different storage needs. Some organizers feature bulky or rigid structures leading to wasted space or limited accessibility. Many existing organizers are designed for a single purpose, such as holding office supplies, without accommodating varied storage needs. Traditional desk organizers often have unstable bases that are prone to tipping and compartments that restrict quick and easy access to stored items. Most organizers prioritize function over form, lacking visually appealing designs that complement workspaces or living areas. Most organizers are either highly functional or are aesthetically pleasing, but not both. Organizers need to be highly functional. A useful organizer can benefit by being very versatile at storing a wide variety of different items, not just one kind of item in large amounts. A useful organizer has the ability to be adjustable to suit the individual's specific and unique needs. A "one size fits all" approach clearly does not apply to users, because each user stores different items in various amounts. A useful organizer is compact, ergonomic, and can store a large volume of materials. Whereby, the organizer is always competing with work or study space and be used multiple times an hour and needs to be relatively small and easy to reach and use. It almost goes without saying that there is a value in an organizer that efficiently holds as much volume of materials as possible.

It is an object of the present invention to provide a multifunctional organizer that is adjustable to the needs of a user, while maintaining an aesthetically pleasing appearance.

SUMMARY OF THE INVENTION

The present invention provides a multifunctional organizer that combines storage optimization, modular adjustability, and ergonomic functionality in a compact, bird-inspired structure that distributes storage functions across its anatomical features. The organizer includes a base with a flat bottom and a curved wall that surrounds a central main body. A flat open storage area is formed between the base wall and the main body for accessible item placement. The main body defines a central cavity adapted to receive items and incorporates removable dividers and paired slots, allowing users to reconfigure the interior layout to accommodate different sizes and types of stored objects. A neck extends from the main body to a head containing a rear-facing cavity and a beak configured to support small hanging items. Wing-shaped side cavities and tail-like finger extensions provide additional storage zones while maintaining a symmetrical, visually cohesive structure. The integration of these functional compartments into a symbolic bird form offers a unique solution that balances visual appeal with practical usability. The invention provides a versatile storage solution with customizable compartments, making it suitable for a wide range of applications across home, office, and utility spaces. It can be used to organize stationery, electronics, tools, jewelry, cosmetics, kitchen items, and general household goods, offering a compact and adaptable system for decluttering and improving accessibility.

DETAILED DESCRIPTION

The present invention is a multifunctional organizer 10 that is in a shape of a bird and shown as a dove in FIGS. 1-18. The organizer 10 has many features that allow an observer to recognize that the organizer resembles a peaceful dove. This may seem trivial, but organizers by their very nature are used and seen all the time, in fact almost every single day. It makes no more sense to tolerate an ugly looking and uninspiring object on a desk than it is to tolerate an ugly looking and uninspiring object on a wall of a living room. Good art inspires us, and so should organizers.

Figure 1:
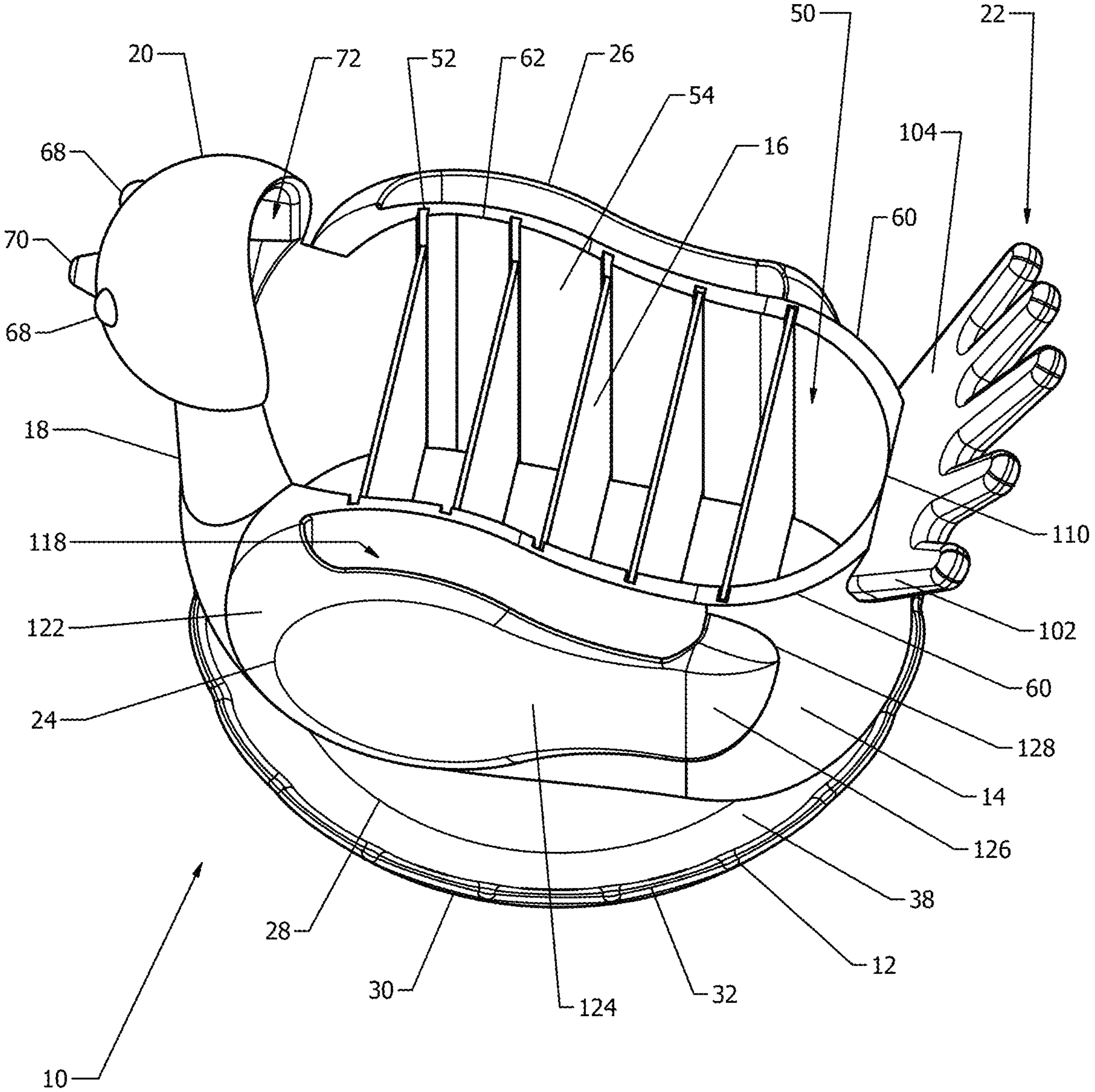
FIG. 1 is a perspective top view of an organizer according to the present invention.
Figure 9:
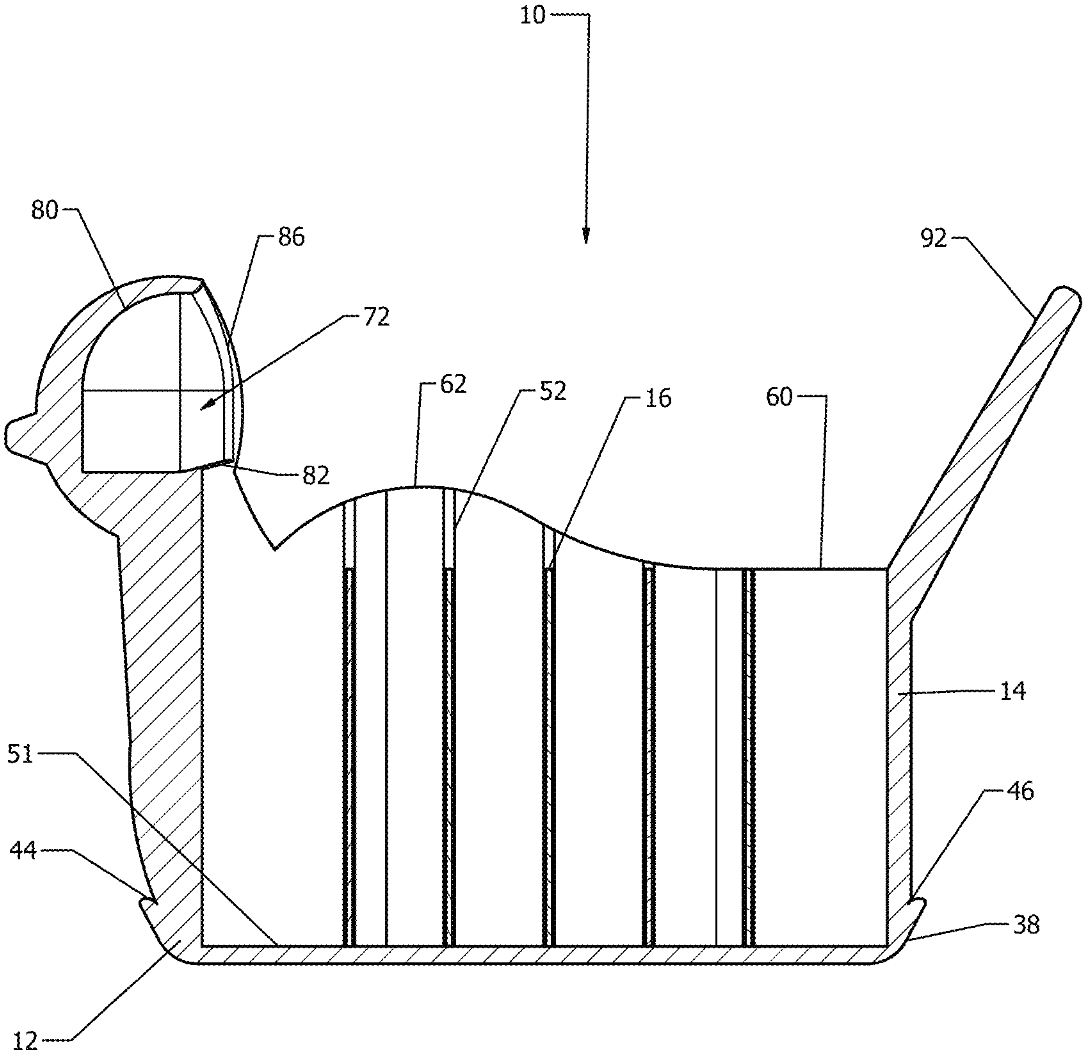
FIG. 9 is a sectional side view of FIG. 8 of an organizer according to the present invention.

FIG. 1 shows a one-piece bird-shaped multifunctional organizer 10. The organizer 10 includes a base 12, main body 14, dividers 16, a neck 18, a head 20, a tail 22, a left wing 24 and a right wing 26. The base 12 includes an inside upper surface 28, an outside lower surface 30 and an edge 32 between the inside upper surface 28 and the outside lower surface 30, as shown in FIGS. 1-7. The outside lower surface 30 of the base 12 includes a flat bottom 34. The flat bottom 34 of the base 12 supports the organizer 10 on a desktop in a stable fashion. The inside upper surface 28 and the outside lower surface 30 of the base 12 curves upward from the flat bottom 34 to form an edge 32 and provide a wall 38 about an outer perimeter of the base 12 in the shape of a nest. The edge 36 of the base 12 shown is shown as a series of scallops, each with a soft curved edge 42 that provides a degree of safety for the user. The flat bottom 34 of the base 12 can include a non-slip surface or treatment to prevent the organizer 10 from slipping or sliding once placed on a surface. FIG. 9 shows the base 12 has a front intersection 44 that serves as a transition between the base 12 and the main body 14 in a forward direction that is closer to a front of the main body 14. The base 12 has a back intersection 46 that serves as a transition between the base 12 and the main body 14 in a rearward direction that is closer to a rear of the main body 14. The base 12 provides a high degree of stability for the main body 14, even when placed on small desktops.

Figure 2:
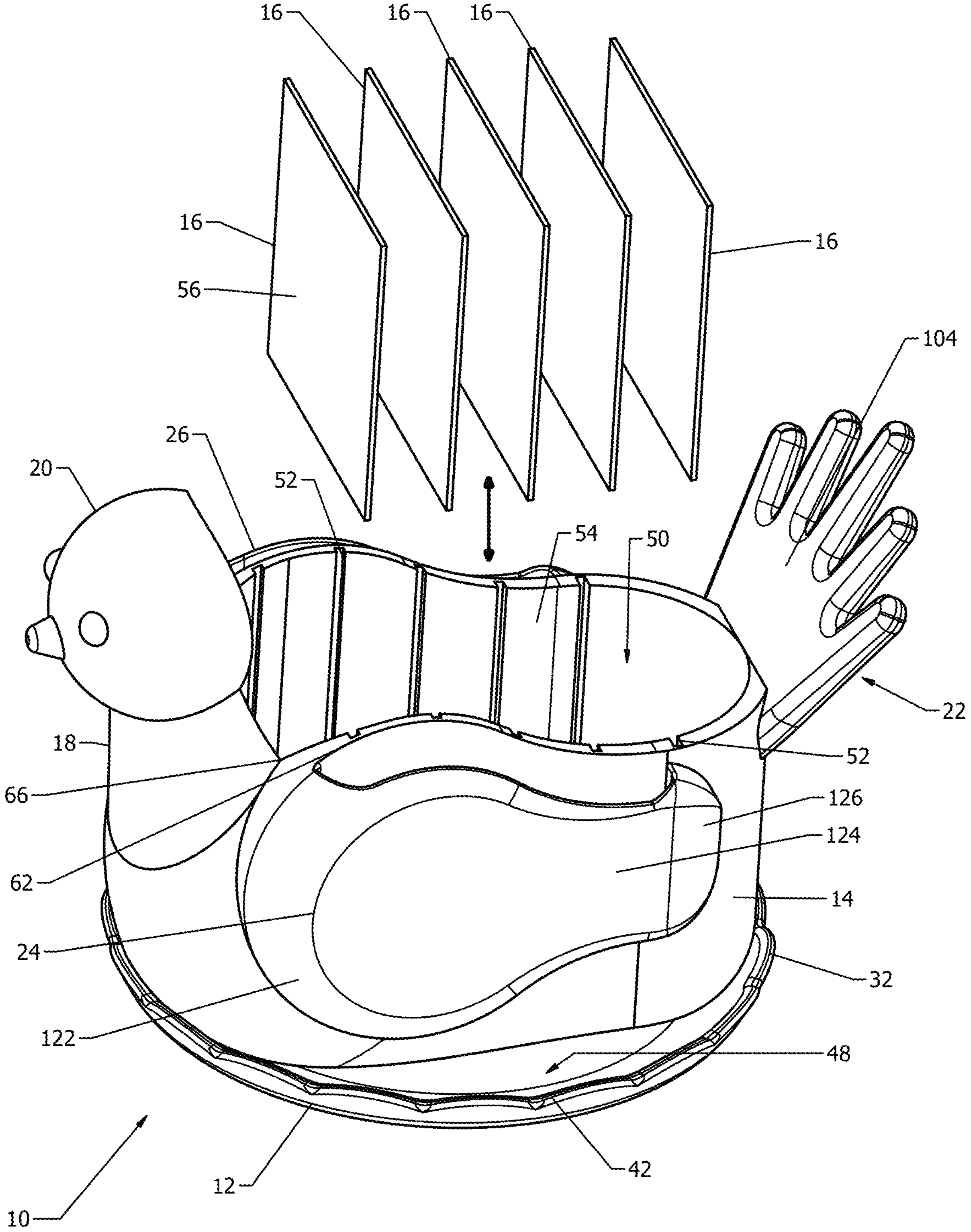
FIG. 2 is a perspective exploded side view of an organizer according to the present invention.
Figure 3:
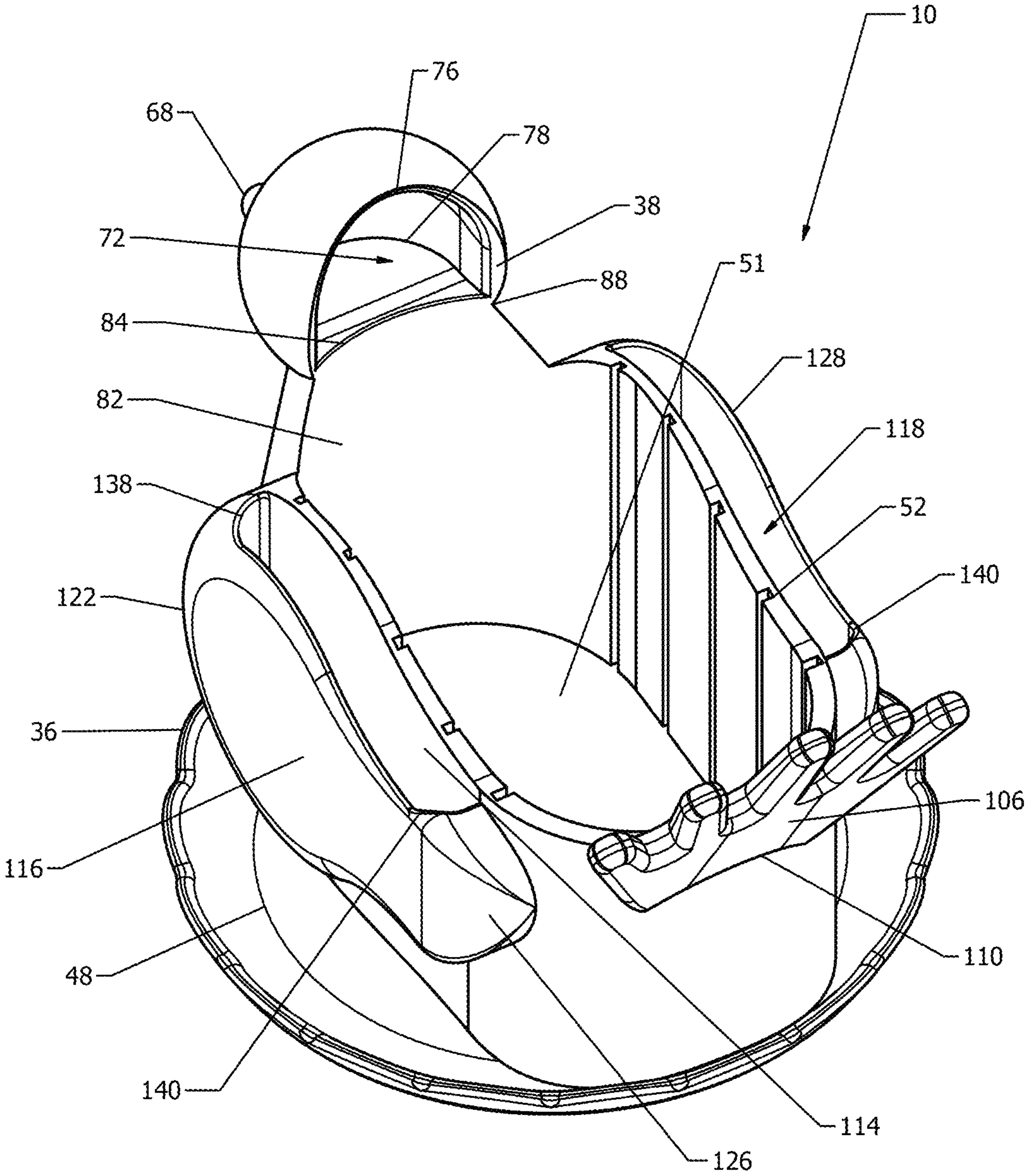
FIG. 3 is a perspective rear view of an organizer according to the present invention.

The main body 14 extends up from the base 12 and includes an outside shape that forms a torso of the bird. The base 12 extends outward from the bottom of the main body 14 and provides flat open storage space 48 on the inside upper surface 28 of the base 12 between main body 14 and the wall 38 of the base 12. The base 12 and the main body 14 resemble a dove by fostering an image of a scalloped nest on which the dove appears to be resting peacefully. Where the phone or tablet rests on the space of the flat open storage 48 and may be leaned against the main body 14. The main body 14 includes an open body cavity 50 with pairs of divider slots 52 in an inside wall 54 of the main body 14 that surrounds the body cavity 50. The divider slots 52 are for receiving the dividers 16 that are removable and insertable into the body cavity 50. FIG. 1 shows the dividers 16 installed in the body cavity 50 to create sub compartments. The slots 52 are arranged in the body cavity 50 to create a variety of adjustable storage compartments within the body cavity 50. FIGS. 2 and 9 show dividers 16 sized and shaped to define storage within the body cavity 50 as a variety of multifunctional and adjustable storage sub compartments. Each of the dividers 16 have a square and flat surface 56 that allows the insertion and removal of the dividers 16 into the slots 52 of the body cavity 50. The dividers 16 may be thin and are quickly removable, whereby a large sub compartment can be transformed into two smaller sub compartments by simply inserting one of the dividers 16 into an open pair of slots 50. This quick versatility invites the user to fashion a storage system that is easily adjustable, versatile, and multifunctional. FIG. 3 shows the bottom 51 of the body cavity 50 being a flat surface.

Figure 7:
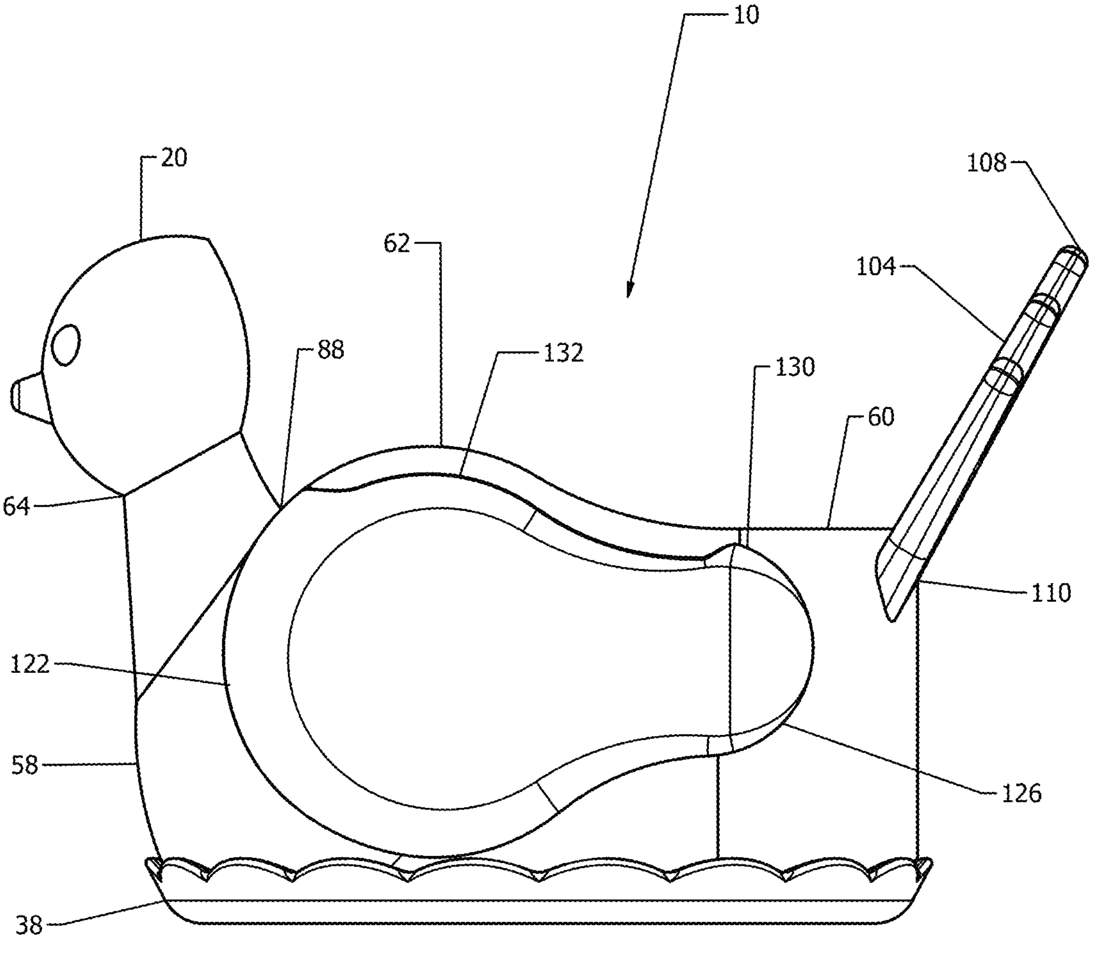
FIG. 7 is a side view of an organizer according to the present invention.

FIG. 7 shows the outside surface at the front of the main body 14 defines an outer chest 58 that is curved and contoured to form a smooth transition from the neck 18. FIGS. 1 and 7 show the outside surface of the main body 14 has a lower curve 60 in the rear of the main body 14, where the outside surface begins to transition to a tail region opposite the front of the main body 14. The body cavity 50 is further defined by a higher curve 62 that represents a highest point of the body cavity 50 that projects above sides that form a left wing 24 and a right wing 26.

FIGS. 1-5 show a neck 18 connecting the head 20 to the main body 14. FIG. 2 shows the neck 18 extending up from the front of the main body 14 to support the head 20. The neck 18 is connected to the head 20 at point 64, as well as connected to the main body 14 at point 66. The neck 18 elevates the head 20 above the majority of the main body 14. FIG. 3 shows that the body cavity 50 curves up at the front to match a curved contour of an inside surface of the neck 18. The neck 18 can be used to hang necklaces, rubber bands, and other items that can be draped around the neck 18 after being moved past the head 20.

Figure 12:
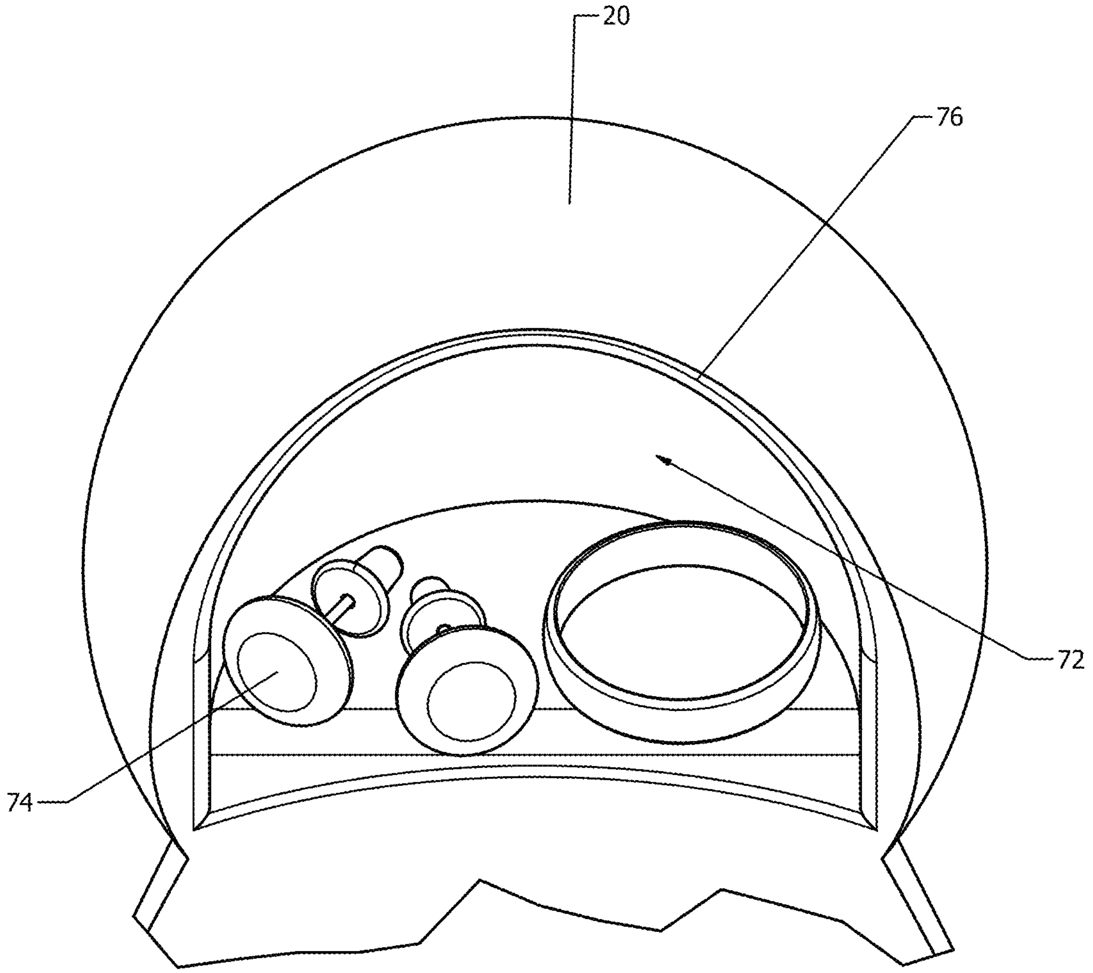
FIG. 12 is a perspective rear view of an organizer according to the present invention.
Figure 13:
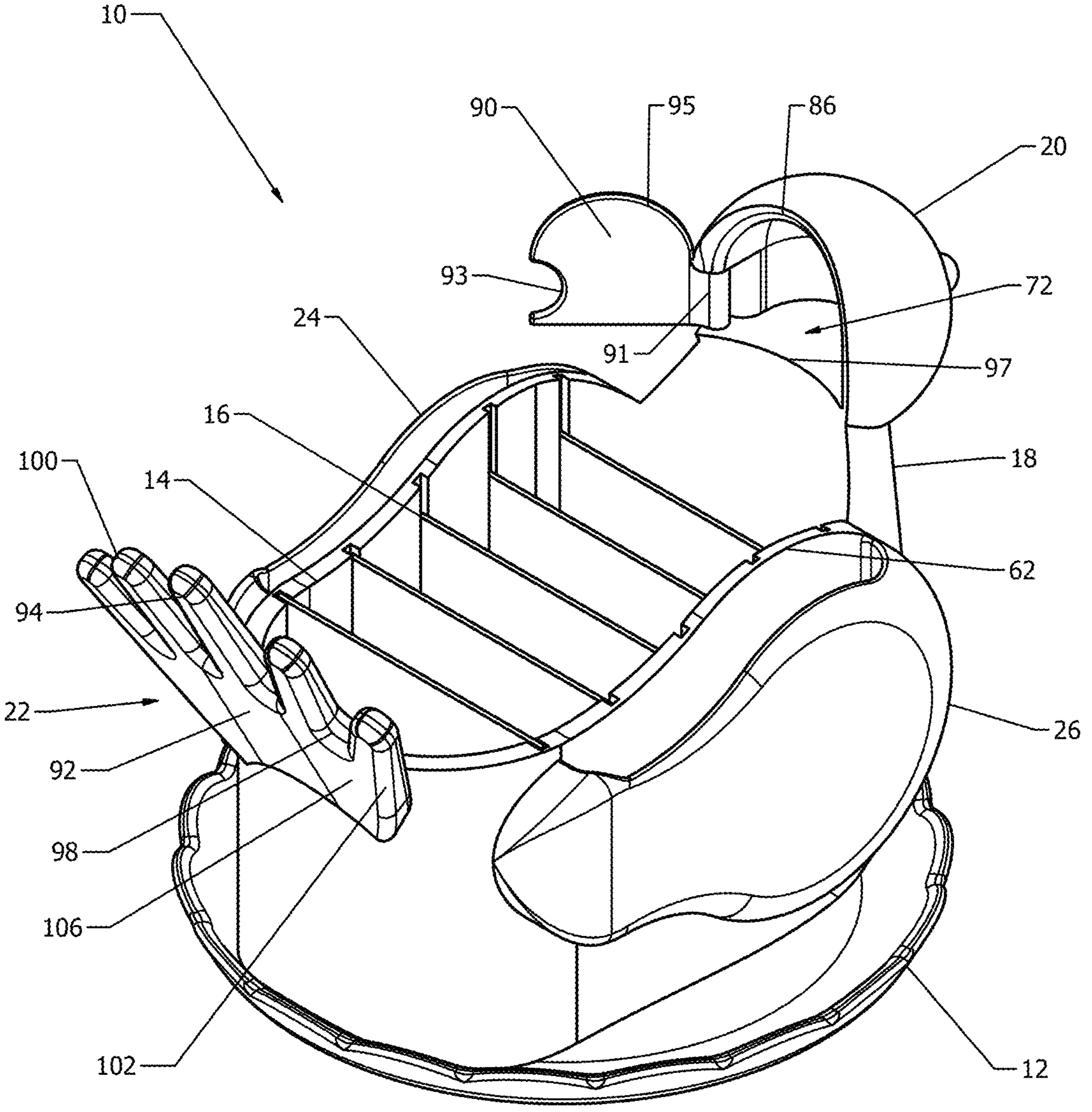
FIG. 13 is a perspective side view of an organizer according to the present invention.

The head 20 faces off from the front of the main body 14 displaying the bird shaped face. The head 20 is shown as a spherical shape with two eyes 68 and a beak 70. The beak 70 can be used to hold small items such as a pair of eyeglasses. The head 20 includes a head cavity 72 in the rear of the head 20 that is a storage compartment for the storage of items. FIG. 12 show items 74 in head cavity 72. As the head 20 is shaped in the spherical shape, an arch-shape 76 is formed at the top of the head cavity 72 in the back side of the head 20 to create additional space for storage. FIG. 3 shows an arch with internal depth 78 which provides increased volume, as well as the result of a curved ceiling 80 shown in FIG. 9. Another feature of the head cavity 72 is an upwardly tilted slope 82 located at the edge of the head cavity 20 shown in FIG. 9. The upwardly tilted slope 82 serves to help retain storage materials within the head cavity 72 to ensure that the items do not fall out of storage inadvertently. To ensure a smooth transition at the upwardly tilted slope 82, the upwardly tilted slope 82 has a fillet 84 which serves as an extra measure of safety for the user of the main body 14. As a safety measure, ergonomic and safety curves 86 are provided near the transition between the neck 18 and the head 20 shown in FIG. 9. FIG. 13 shows an addition of a door 90 that can be opened and closed along a hinge to close off the head cavity 72. The door 90 may have a living hinge 91 that allows the door 90 to pivot open and close to secure the head cavity 72. A finger hole 93 on the side of the door 90 provides a way to open and close the door 90. Where the finger hole 93 allows the user to insert a finger and pull or push the door 90 open or closed as desired. The door 90 has a curved edge 95 to provide an extra degree of safety for the user and also to ensure that the door 90 has the same general profile as the curves of the head cavity 72. FIG. 13 shows a bottom edge of the head cavity 72 has a flat edge at point 97 to match the bottom edge of the door 90.

Figure 4:
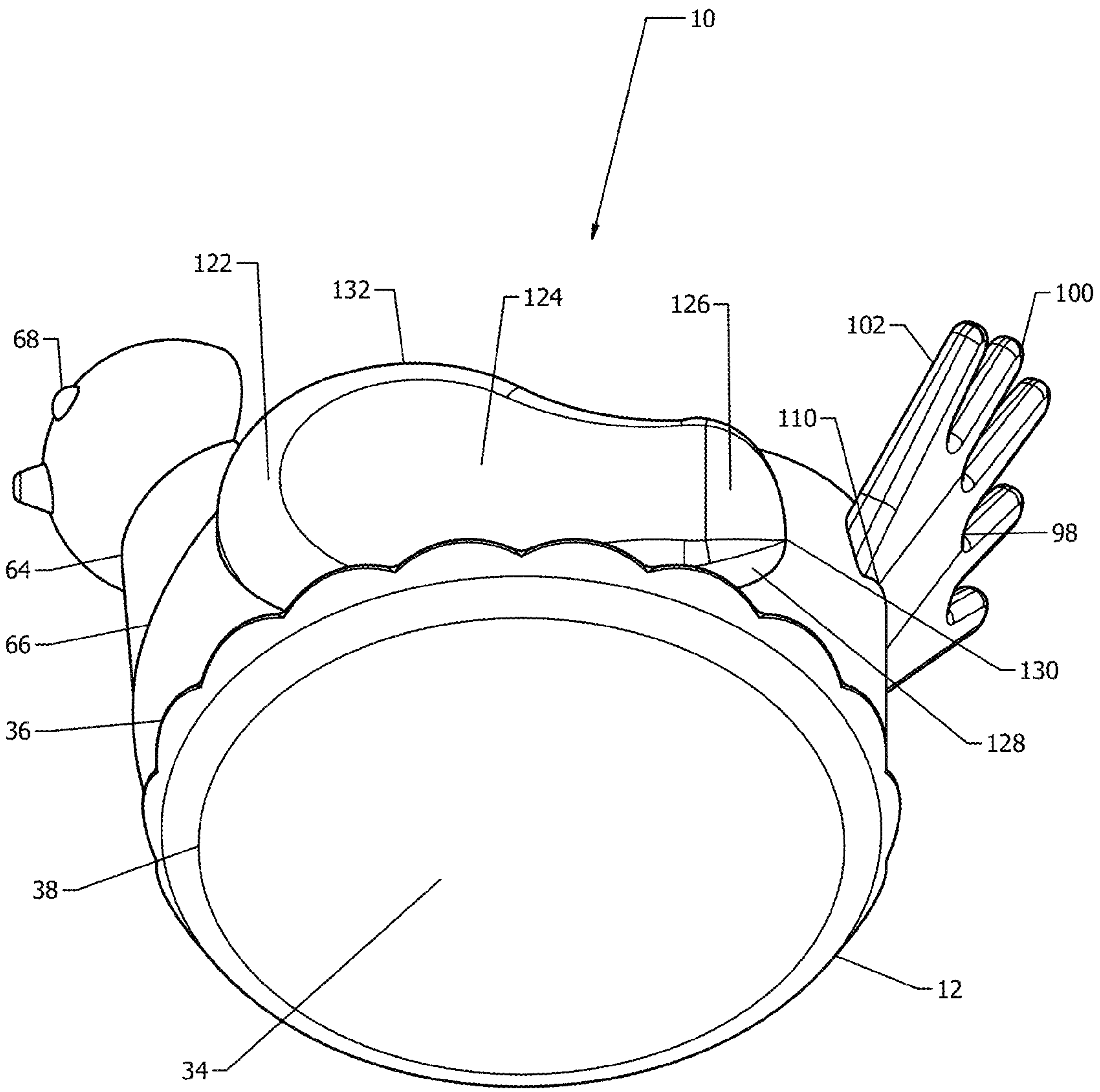
FIG. 4 is a perspective bottom view of an organizer according to the present invention.
Figure 5:
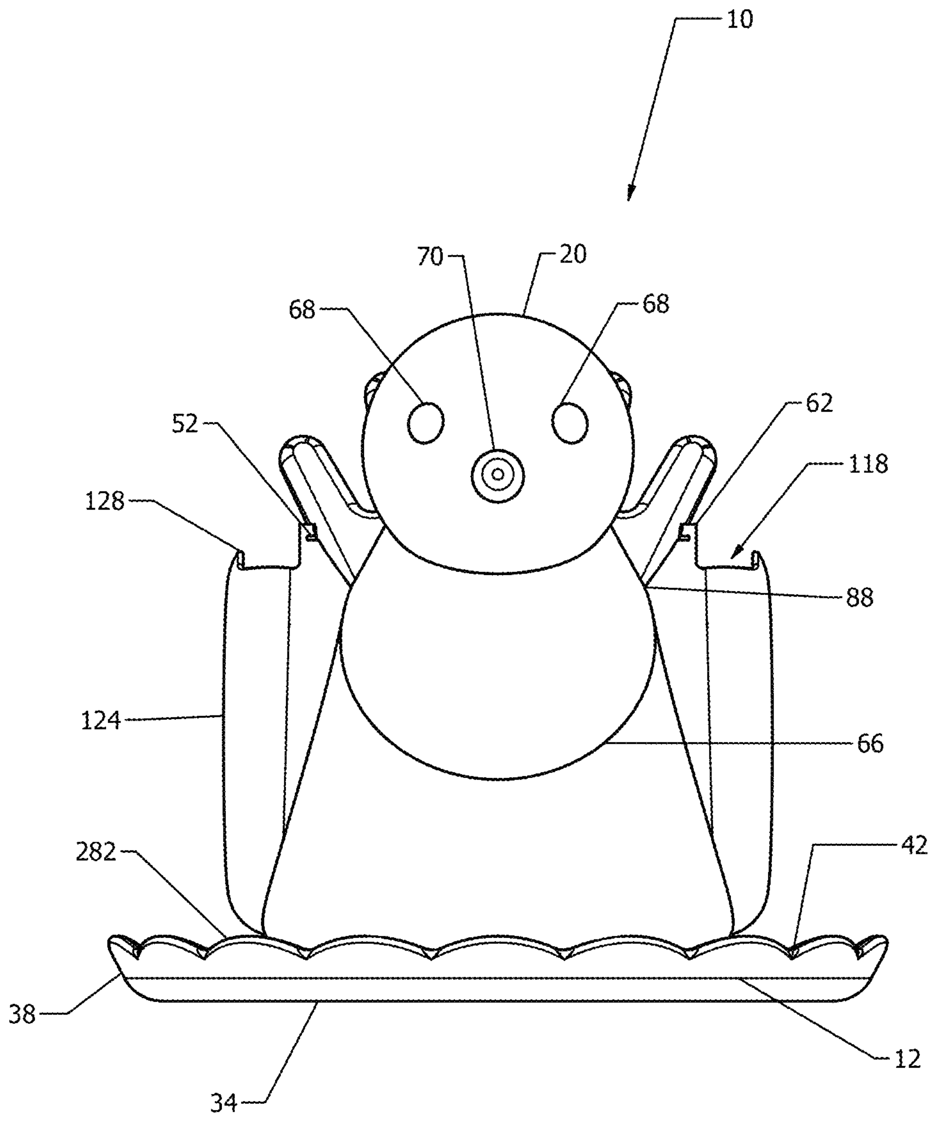
FIG. 5 is a front view of an organizer according to the present invention.
Figure 6:
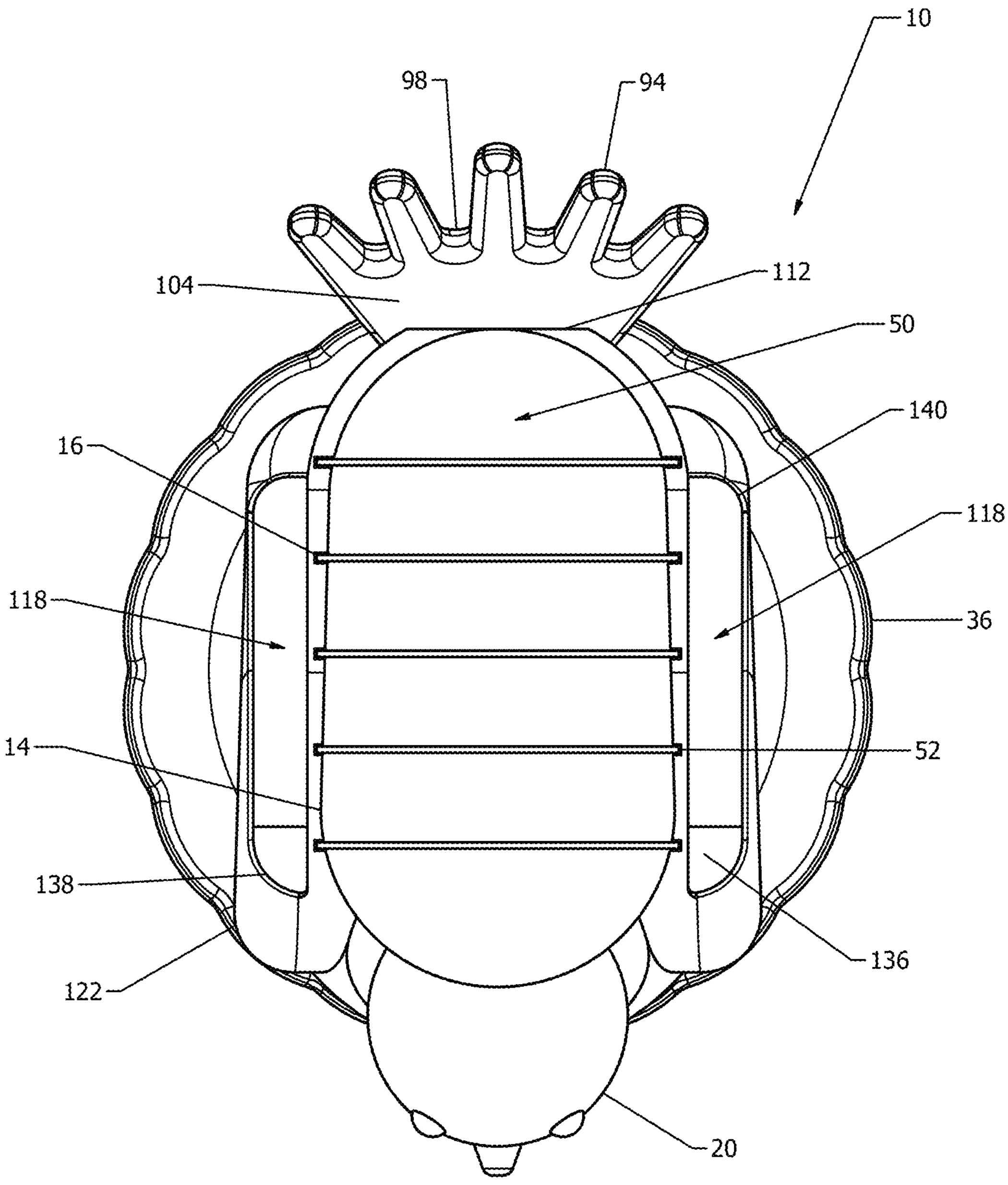
FIG. 6 is a top view of an organizer according to the present invention.
Figure 14:
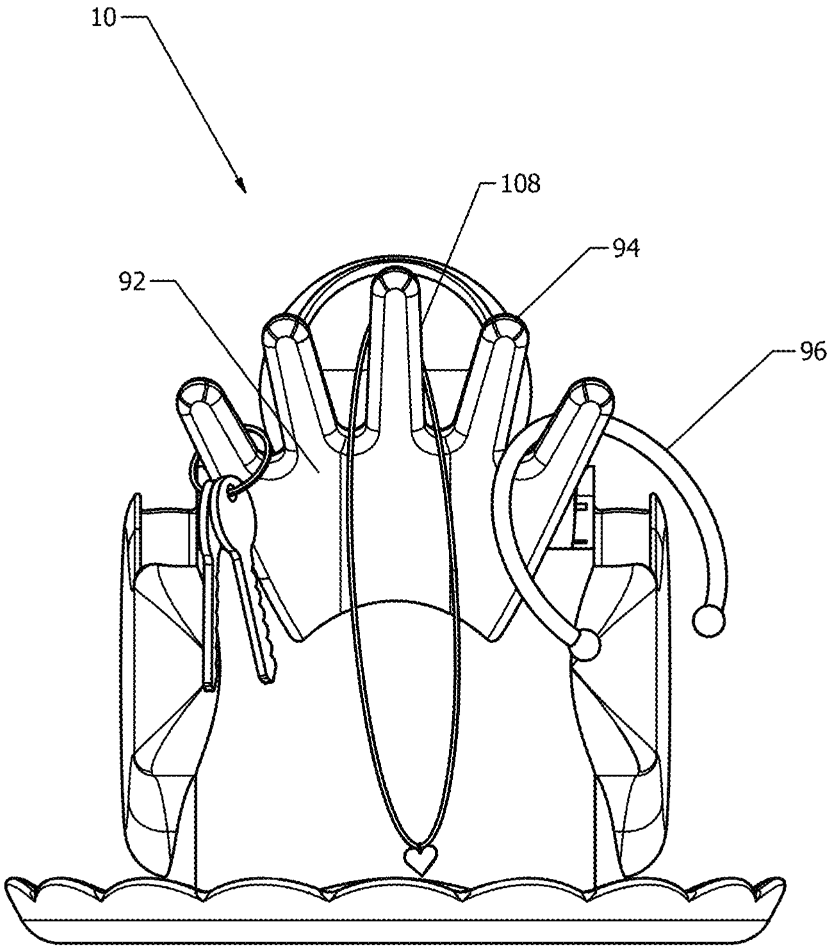
FIG. 14 is a rear view of an organizer according to the present invention.

The tail 22 includes a tail body 92 and finger extensions 94. The finger extensions 94 act as tail feathers. The tail body 92 extends up from the rear of the main body 14. The finger extensions 94 extend up from the tail body 92. The finger extensions 94 include open spaces between each finger extension 94 to allow the finger extensions 94 to receive items to be hung about the finger extensions 94. FIG. 14 shows items 96 on the finger extensions 94, where each finger extension 94 can serve as a hook or hanger for items like a rubber band, a lanyard, or a necklace. Two outside finger extensions 94 resemble short feathers and are each next to a finger extension 94 that resembles medium feathers. The two finger extensions 94 that resemble medium feathers are on either side of two finger extensions 94 that resemble larger feathers located in the middle of the tail 22 between the medium feathers and the small feathers as shown in FIG. 1. The collection of finger extensions 94 has curves 98 between each of the finger extensions 94 to form the open spaces. The finger extensions include curved tips 100 at the ends of the finger extensions 94 and a series of surface curves 102 that help to define the exterior look to resemble feathers. In order to enhance resembling tail feathers of a dove, the top surface and the bottom surface of the finger extensions 94 form a flat top surface 104 and a flat bottom surface 106 of the tail 22. This arrangement of tail body 92 and the finger extensions 94 resembles radially fanned out and the relatively flat shape of the tail feathers of a dove. FIGS. 4, 6, and 7 show, the tail 22 is formed in order to provide additional strength and less load in key locations so the tail 22 is not fragile. The far ends of the finger extensions 94 each have a slight taper 108 that lowers the weight at the ends of the finger extensions 94 and makes the finger extensions 94 less likely to break under a load. The tail 22 attaches to the main body 14 at a smooth transition below the tail body 92 at a tail curve 110 to reduce the chance that the projecting tail 22 can break. Finally, the tail 22 smoothly transitions along the upper end of the rear of the main body 14 and along the body cavity 50 to provide a multifunctional and adjustable storage compartment at tail intersection 112, as seen in FIG. 6. The collective choices of the slight taper 108, the tail curve 110, and the tail intersection 112, promotes a tail 22 that is as strong as possible without preventing the tail 22 from successfully resembling the tail feathers of a dove.

Figure 10:
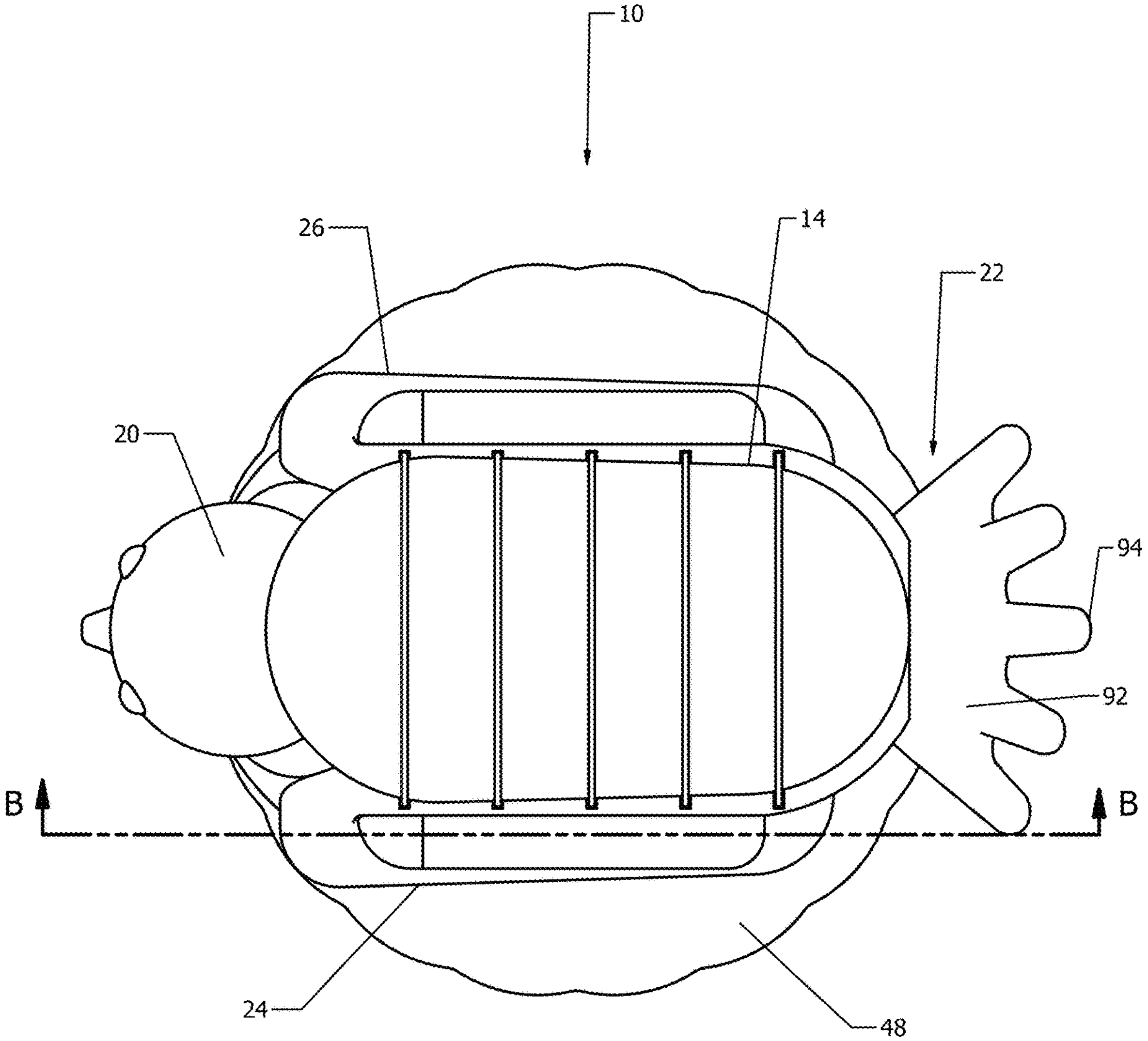
FIG. 10 is a top view of an organizer according to the present invention.
Figure 11:
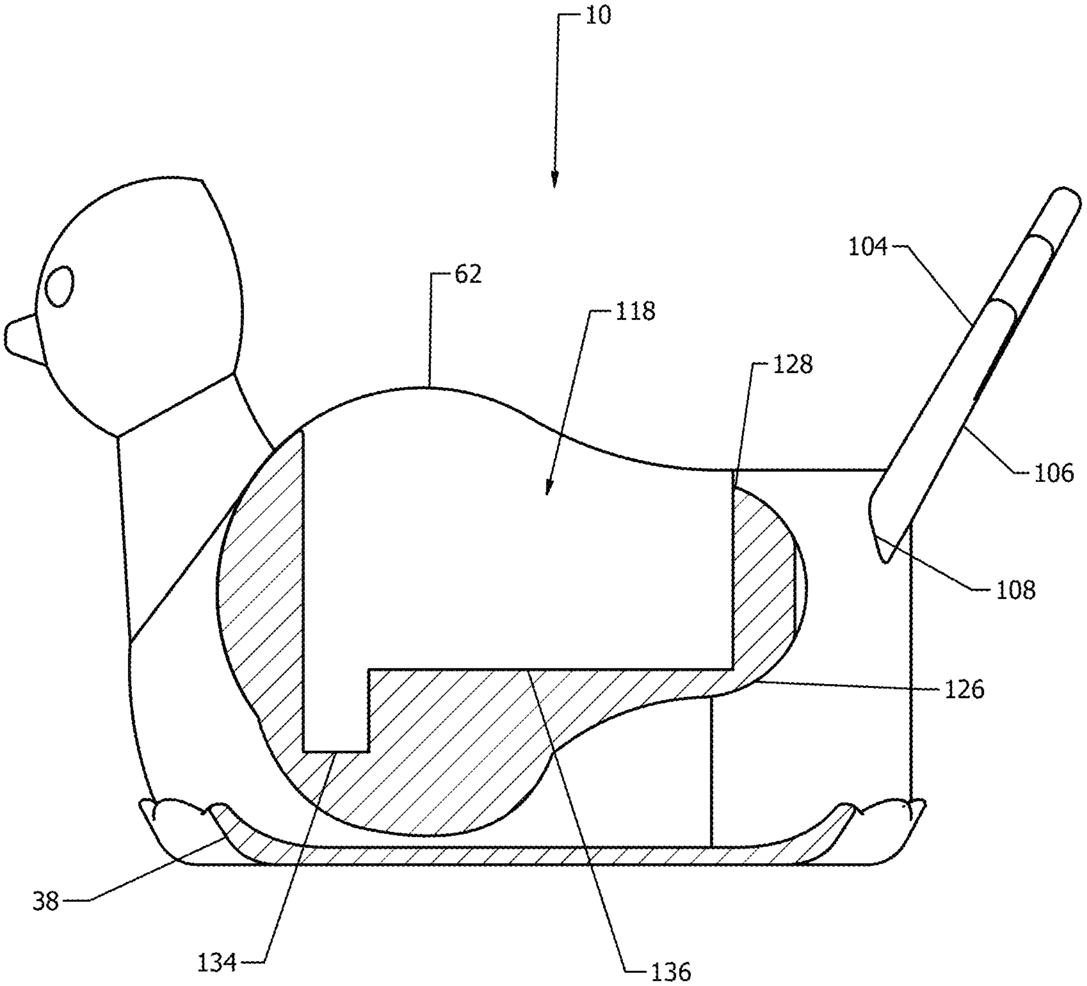
FIG. 11 is a sectional side view of FIG. 10 of an organizer according to the present invention.

The left wing 24 extends from the left side of the outside surface of the main body 14 and the right wing 26 extends from the right side of the outside surface of the main body 14. The left wing 24 and the right wing 26 each have an inside surface 114 and an outside surface 116. The outside surface 116 of each of the left wing 24 and the right wing 26 has a series of curves that form the appearance of a wing as the outside surface 116 meets the outside surface of the main body 14. The outside surface of the main body 14 and inside surfaces 114 of each of the left wing 24 and the right wing 26 forms a side cavity 118 for storage within each of the left wing 24 and the right wing 26. FIG. 10 shows a cross-sectional line that defines a plane that intersects the side cavity 118 of the left wing 24. FIG. 11 shows the side cavity 118 having two depths. The body cavity 50 is further defined by a higher curve 62 that represents a highest point of the body cavity 50 that projects above sides of the main body 14 to form the left wing 24 and the right wing 26, as shown in FIGS. 1 and 13. The left wing 24 and the right wing 26 are mirror images of each other.

FIGS. 3 and 4 show both the left wing 24 and the right wing 26 include a forward wing curve 122 and a flat wing portion 124 located on the outside surface 114 of each of the left wing 24 and the right wing 26 that defines the shape of the left wing 24 and the right wing 26. A wing taper 126 is shown near the back of the left wing 24 and the right wing 26 and a fillet curve 128 that is located near the top side of the left wing 24 and the right wing 26 to also define the overall shape of the left wing 24 and the right wing 26. The wing shape of the left wing 24 and the right wing 26 with the main body 14 creates the overall resemblance of a dove. The exterior of the left wing 24 and the right wing 26 resemble the distinctive shape of wings in nature with a shorter portion 130 in the back of the left wing 24 and the right wing 26 that then widens to a higher portion 132 near the middle of the left wing 24 and the right wing 26 as shown in FIG. 7. FIG. 11 shows the side cavity 118 includes a deep cavity section 134 near the front of the left wing 24 and the right wing 26 and front of the main body 14. The side cavity 118 includes a flat bottom 136 rearward from the deep cavity section 134. FIG. 3 illustrates how a front curve 138 and a rear curve 140 help to define the transition from the shape of the left wing 24 and the right wing 26 to the side cavity 118 to as additional storage compartments for the organizer 10. The deep cavity 134 is can be used to retain pens and pencils.

Figure 8:
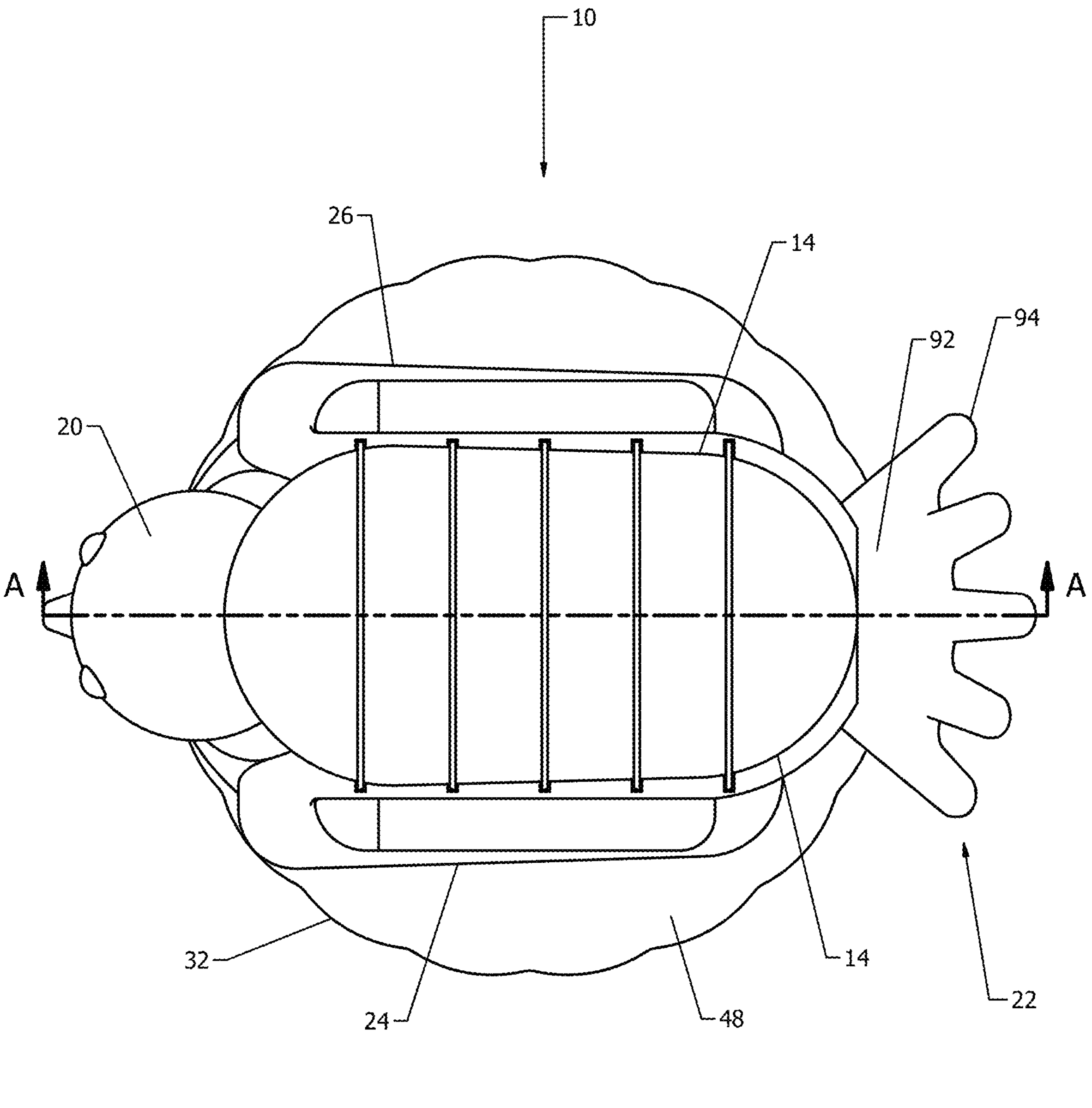
FIG. 8 is a top view of an organizer according to the present invention.
Figure 15:
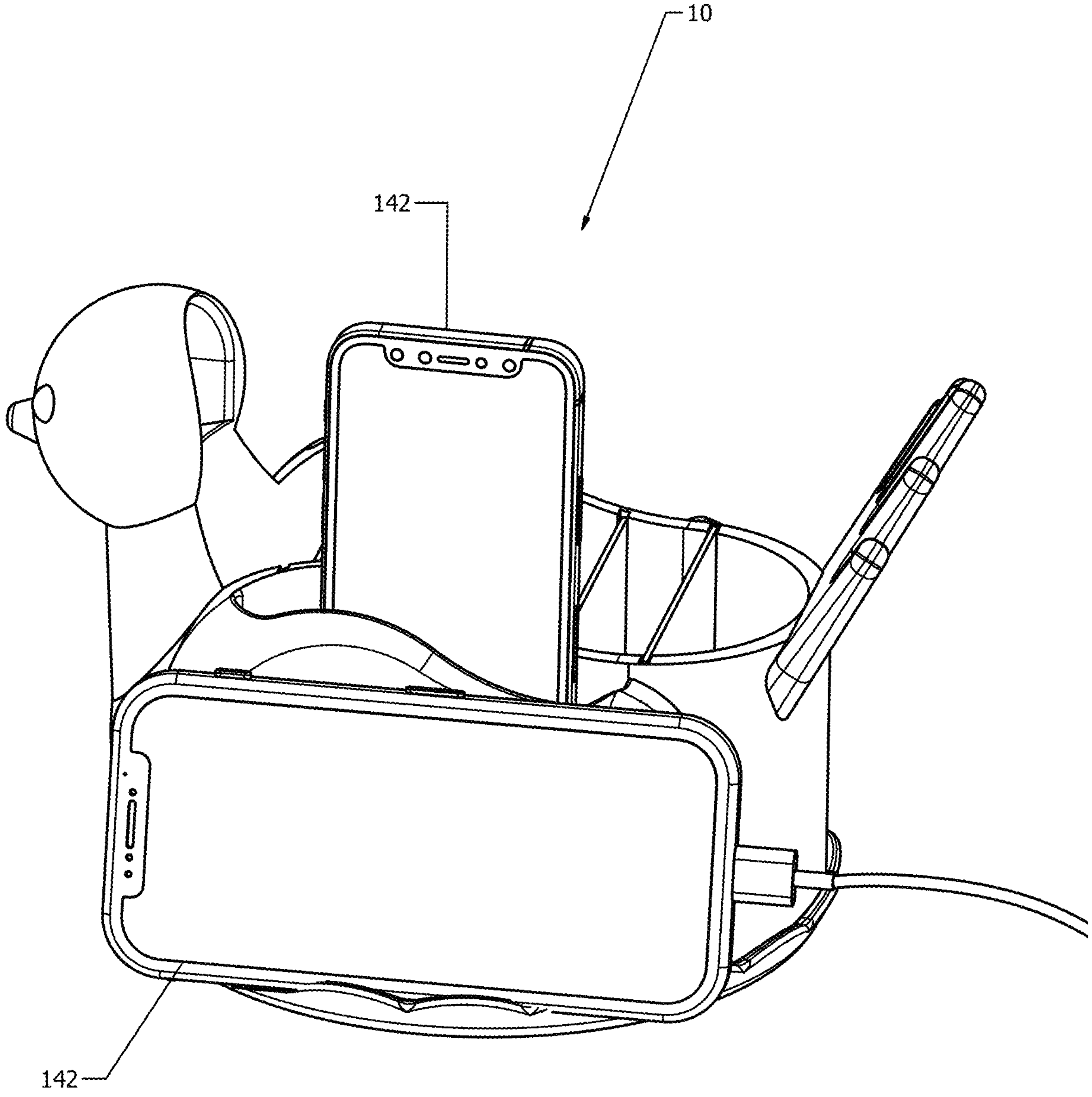
FIG. 15 is a perspective side view of an organizer according to the present invention.
Figure 16:
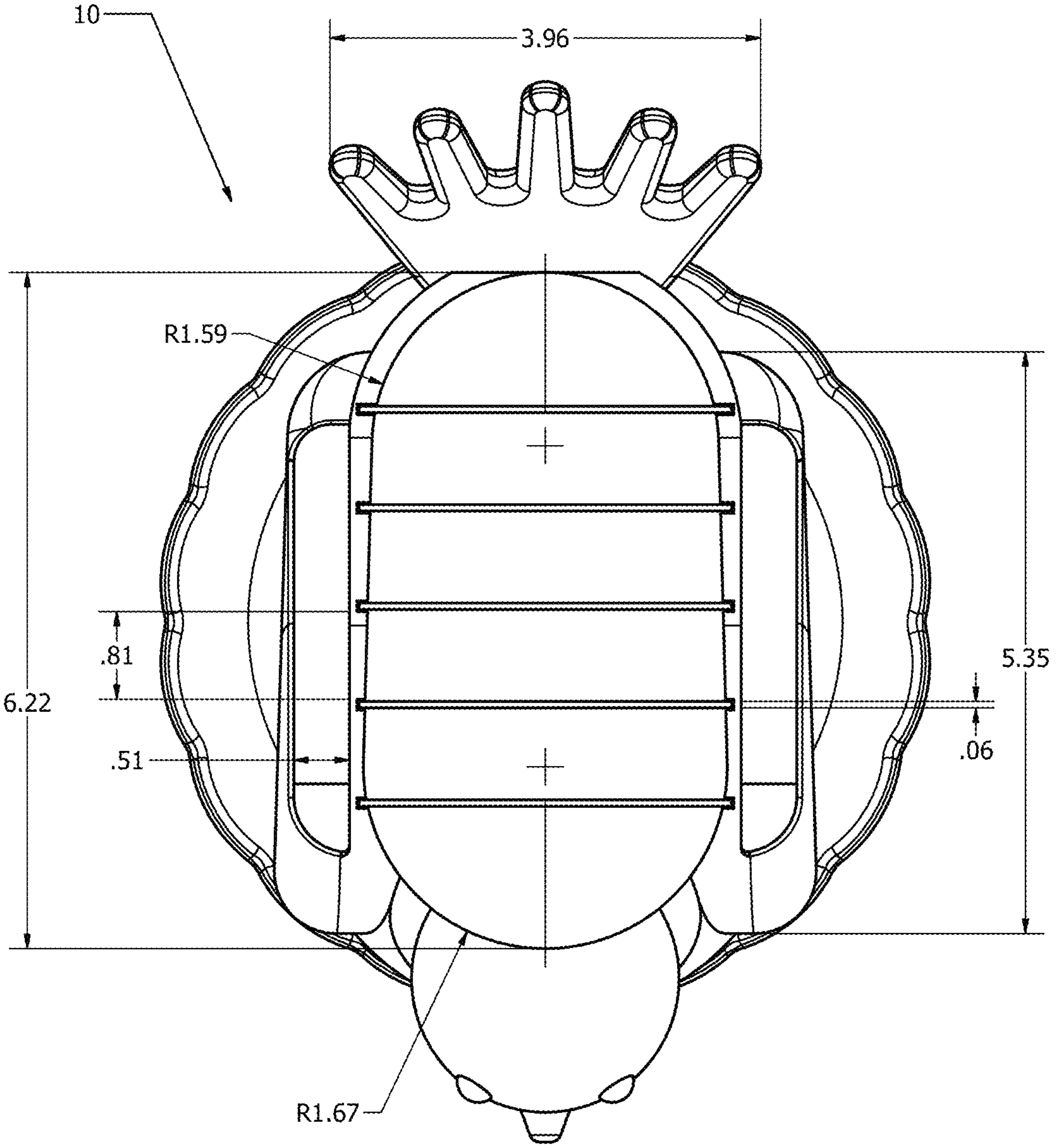
FIG. 16 is a top view of an organizer according to the present invention.
Figure 17:
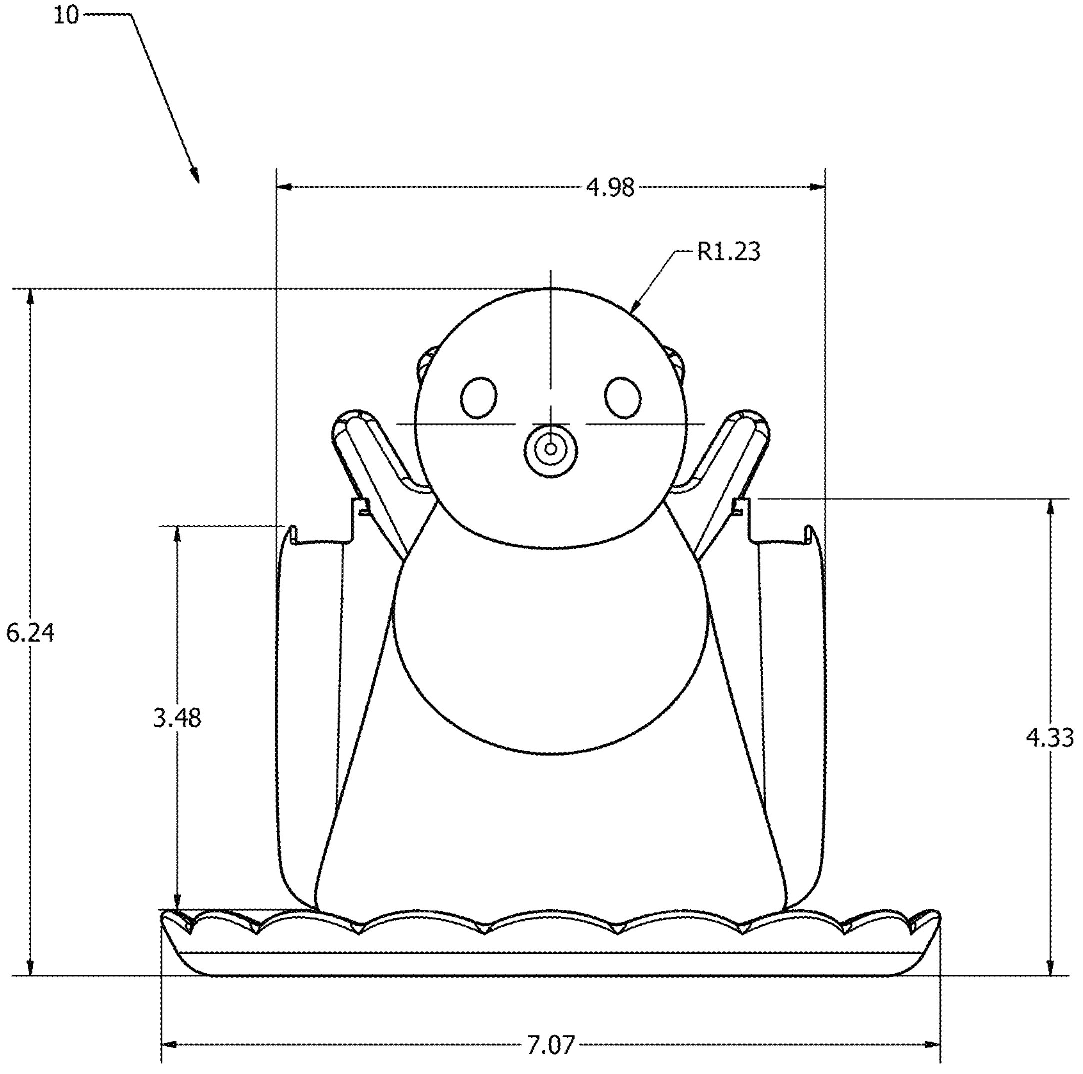
FIG. 17 is a front view of an organizer according to the present invention.
Figure 18:
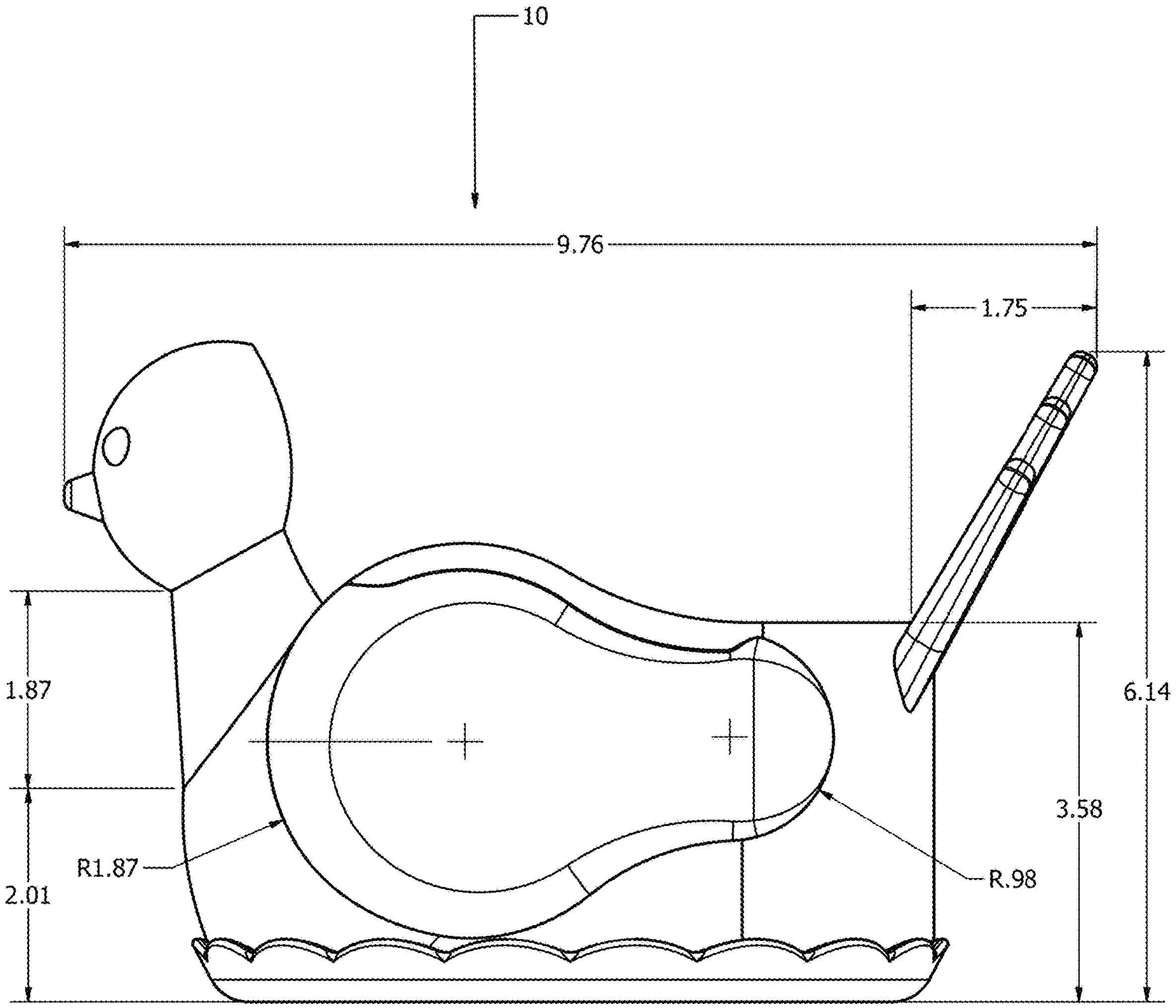
FIG. 18 is a side view of an organizer according to the present invention.

FIG. 8 shows a cross-sectional line is shown through the main body 14 that intersects the body cavity 50, which then becomes the foundation for FIG. 9. FIG. 9 is a view of the main body 14 taken from the point of view of the cross-sectional plane denoted in FIG. 8. The head cavity 72 and the body cavity 50 are shown with dividers 16 inserted to illustrate the relationship between two storage positions within the main body 14. FIG. 8 is a top view of the main body 14 that shows a cross-sectional line that defines a plane that intersects the left side cavity. From a functional point of view, the organizer provides a wide array of storage volume and a variety of different storage options that can be adjusted to suit the needs of the user. The flat open storage space 48 shown provides can serve as a stand for personal devices 142, such as cell phones and tablets in both a vertical or landscape orientation, as shown in FIG. 15. The storage locations include the flat open storage space 48 of the base 12, head cavity 72, around the neck, the side cavities 118, around each of the finger extensions 94 and the body cavity 50. In addition, the body cavity 50 is adjustable by adding, subtracting or moving around dividers 16 to provide a way to cater the storage options to the particular needs or tastes of the user. This demonstrates that the organizer 10 can store many different items of various shapes in a compact design. FIGS. 16-18 shown dimensions of the organizer 10 in inches to illustrate the compact design of the organizer 10. Furthermore, the organizer 10 did not sacrifice aesthetically as described. The head 20 and the neck 18 form the basis for the face of a dove. The finger extensions 94 provide a resemblance to the tail feathers of a dove. The base 12 resembles a nest that a dove may use in nature. Finally, the main body 14 and the left wing 24 and the right wing 26 are shaped and sized to resemble the body of a dove. The organizer 10 is not only very useful as an organizer, but unique, distinctive, and aesthetic as well.

As shown in FIGS. 1-15, the bird-inspired organizer 10 is a thoughtfully engineered structure that optimizes storage efficiency, leverages modular adaptability, and enhances user ergonomics. Organizer 10 turns every part of the bird's anatomy into a dedicated, usable compartment including the head 20, beak 70, neck 18, body 14, wings 24 and 26, tail 22, two crescent-shaped base openings 48, and two scalloped walls 36, that yields a total of eleven distinct storage areas. The five removable dividers 16 and paired slots 52 in the main body 14 offers a total of thirty two unique layout combinations, allowing users to customize the interior to fit items of varying sizes, shapes and quantities. The bird shape of organizer 10 naturally lends itself to ergonomic advantages that enhances user safety and easy accessibility. Its smooth contours and optimal dimensions provide easy reach and reduce the risk of accidental contact with sharp edges, thus enhancing both safety and comfort. Moreover, the carefully proportioned depth, height, and width of each compartment allow for intuitive placement and retrieval of items, addressing a common issue in traditional organizers with deep, narrow compartments that obstruct access.

By integrating storage efficiency, modular adjustability, ergonomic functionality, and symbolic aesthetics, the bird-inspired organizer 10 delivers an innovative and visually appealing solution for home, office, and personal organization needs. The organizer 10 has an aesthetic elegance and ergonomic efficiency that offers an optimized balance of beauty, modular adjustability, and storage efficiency. The organizer 10 provides a versatile storage solution with customizable compartments, making it suitable for a wide range of applications. These applications include but are not limited to the following. Office storage of stationery, writing instruments, and documents in workspaces. Art Studio storage of brushes, paints, and other art supplies. Entertainment Centers for the organization of remote controls and small electronic accessories. Dressing rooms and closets to securely hold jewelry, accessories, and wearable items. Bathrooms and vanities for organizing beauty products, cosmetics, and toiletries. Kitchens and pantries for efficiently storing spice bottles, condiments, and small kitchen essentials. Workstations for neatly storing tools, hardware, and miscellaneous items. Finally, general household use for accommodating various personal and household items for decluttering and accessibility. The organizer 10 can be made of a material selected from the group consisting of wood, metal, or plastic. Plastics can be selected from acrylic, biodegradable plastic, or a composite polymer.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

We claim:

1. A multifunctional organizer, comprising:

a base, said base having an inside upper surface and an outside lower surface, said inside upper surface and outside lower surface curving up to an edge about an outer perimeter of said base to form a wall about said base, said outside lower surface including a flat bottom to support said organizer;

a main body extending up from said base, said main body having a front, a rear and two sides, said main body having body cavity, said body cavity adapted to receive items;

a flat open storage area between said wall of said base and said main body;

a neck extending from said main body, said neck adapted to receive hanging items;

a head extending from said neck, said head having a front and a rear, said front of said head facing away from said front of said main body, said rear of said head facing toward said rear of said main body, said rear of said head including a head cavity adapted to receive items;

a plurality of finger extensions extending from said rear of said main body, spaces between said finger extensions that are adapted to receive hanging items; and a side cavity on an outside of said main body on each of said sides of said main body, said side cavity adapted to receive items.

2. The organizer of claim 1, further including at least one divider and at least one pair of slots in said body cavity to receive and support said divider.

3. The organizer of claim 2, wherein there is a plurality of said dividers and a plurality of said paired slots.

4. The organizer of claim 1, further including a door attached to said head to close off said head cavity.

5. The organizer of claim 1, further including a tail body extending from said rear of said main body and between said main body and said finger extensions, said tail body being a support for said finger extensions.

6. The organizer of claim 1, wherein said neck includes a rear contour which aligns with said body cavity to provide additional area for storage.

7. The organizer of claim 3, wherein each of said plurality of slots are a series of grooves extending toward both of said sides and said slots are evenly spaced apart.

8. The organizer of claim 7, wherein a highest point of said organizer is defined as a farthest point of a top surface from a bottom surface, and wherein said dividers remain below said highest point to ensure protection of stored contents.

9. The organizer of claim 7, wherein said body storage cavity has a first depth between said sides and said slots and a second depth between said sides and said slots, wherein said first depth is greater than said second depth to allow storage of larger objects.

10. The organizer of claim 1, wherein said main body comprises a front side opposite a rear side, a left side opposite a right side, and a top side opposite a base side, providing structural integrity, portability, and ease of assembly.

11. The organizer of claim 10, wherein said base side includes a flat bottom surface adapted to provide stability on a flat surface, and a raised wall forming a storage cavity adapted for small items, said base serving both as foundation and functional compartment.

12. The organizer of claim 11, wherein said raised wall includes a scalloped edge surrounding said raised wall that is adapted to function as a support stand for holding external items.

13. The organizer of claim 10, wherein the left side and right side each include a wing extending outward from the main body, said wings structures being symmetrically shaped and sized, and each including an internal side cavity for additional storage capacity.

14. The organizer of claim 13, wherein each wing includes an upper surface surrounding a side cavity, said side cavity being recessed below a highest top surface of said organizer to retain stored items therein and prevent spillage during movement.

15. The organizer of claim 10, wherein said head is positioned at the front side of the main body, said head including a beak and two eyes, said beak being adapted to hold small items such as a pair of eyeglasses.

16. The organizer of claim 1, wherein said finger extensions include curved or notched edges shaped to hold hanging items, said finger extensions maintaining radial symmetry.

17. The organizer of claim 1, wherein said organizer is bilaterally symmetrical along a vertical plane extending from said beak through said tail, thereby enhancing both aesthetic appeal and ambidextrous access and manufacturing uniformity.

* * * * *